United States Patent Office — 2,726,241 — Patented Dec. 6, 1955

2,726,241
NEW SERIES OF NITROFURANS

Gabriel Gever, Oxford, and William C. Ward, Norwich, N. Y., assignors, by mesne assignments, to The Norwich Pharmacal Company, Norwich, N. Y., a corporation of New York No Drawing. Application January 15, 1954, Serial No. 404,391

6 Claims. (Cl. 260—240)

This invention relates to a new series of chemical compounds which have proved of chemotherapeutic value, especially when administered orally or parenterally. The series includes a number of acid salts of alkylaminoalkyl semicarbazones of nitroacylfurans described by the general formulae:

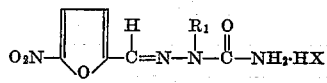

and

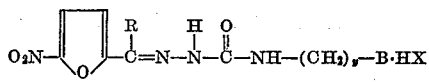

in which

R represents a member of the group consisting of hydrogen and lower alkyl, $R_1$ represents a member of the group consisting of dialkylaminoalkyl, y represents 2-3, B represents a member of the group consisting of mono- and di-lower alkylamino, morpholinyl and piperidyl radicals, and X represents a member of the group consisting of Cl⁻ and Br⁻.

We have made the discovery that the new compounds, while sharing the chemotherapeutic activity possessed by many other nitrofurans in the treatment of bacterial and protozoal infections of the animal body, differ markedly therefrom in that they are readily soluble in water. We believe that this important property of the series of compounds which we have invented is due to the fact that they are obtained as mineral acid salts. While these alkylaminoalkyl semicarbazones of nitroacylfurans exhibit chemotherapeutic activity when in the form of a free base, they do not possess the high aqueous solubility which distinguishes the mineral acid salts thereof.

The ready water solubility of the new series of compounds which we have invented is of particular importance in connection with parenteral medication, a field in which many of the chemotherapeutically active nitrofurans may not be used because of their insolubility in physiologically acceptable vehicles. Our new compounds are readily soluble in such a vehicle. Thus, they provide effective chemotherapeutic agents for parenteral medication. They are also effective when administered orally.

In the practice of our invention, a 2-carbonyl compound of 5-nitrofuran of the following formula:

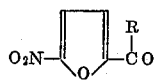

in which:

R is hydrogen or lower alkyl is caused to react with a semicarbazide of the following formula:

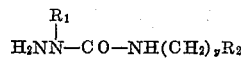

in which:

$R_1$ may be hydrogen or dialkylaminoalkyl $R_2$ may be hydrogen or lower alkyl or a nitrogen atom which is in a cyclized ring or which has from one to two lower alkyl groups linked thereto y represents 0, 2 or 3

In selecting the reactants, when $R_1$ is hydrogen $R_2$ is limited to a nitrogen atom which is in a cyclized ring or has from one to two lower alkyl groups linked thereto, and y represents 2-3; when $R_1$ is dialkylaminoalkyl, R and $R_2$ are limited to hydrogen, and y equals 0.

The water-soluble mineral acid salts may be formed during such reaction or afterwards.

In order that the invention may be entirely available to those skilled in the art, methods for making a number of the new compounds of the series are described briefly:

EXAMPLE I

*5-nitro-2-furaldehyde 4-(3-morpholinopropyl) semicarbazone hydrochloride monohydrate*

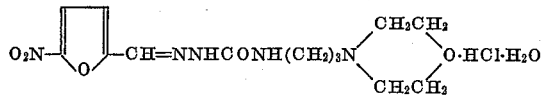

To 40 grams of 3-aminopropylmorpholine heated to 140–145° C. are added portionwise 10 grams of acetophenone semicarbazone. The mixture is heated at this temperature for 10–15 minutes and then poured into 300 grams of ice water. A white solid is deposited. (13.5 grams; M. P. 93–94° C.)

To 8 grams of acetophenone 4-(3-morpholinopropyl) semicarbazone are added 120 cc. of water containing 20 cc. of C. P. hydrochloric acid. This solution is heated upon the steam bath for 10–15 minutes, then cooled and ether extracted to remove the hydrolyzed acetophenone. To the aqueous portion is added dropwise with stirring 4 grams of 5-nitro-2-furaldehyde dissolved in 35 cc. of ethanol. After stirring for approximately 30 minutes, the reaction mixture is cooled and then filtered, yielding 8.8 grams of yellow solid having a melting point of 187–188° C. Yield=88%; M. P.= 187–188° C. (decomposition).

Analysis of this compound showed it to exist as a monohydrate by this method of preparation.

ANALYSIS

| | Calc. | Found |
|---|---|---|
| N | 18.45 | 18.33 |
| Cl | 9.37 | 9.36 |

EXAMPLE II

*5-nitro-2-furaldehyde 4-(3-diethylaminopropyl) semicarbazone hydrochloride*

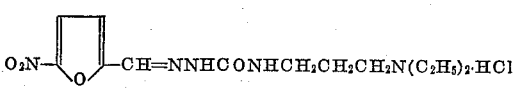

To 25 cc. of 3-diethylaminopropylamine heated to 150° C. is added 6 grams of acetophenone semicarbazone, in portions, over a period of 5 minutes. The solution is kept at 140–160° C. for a further 5 minutes, cooled to 70° C. and then poured into 75 cc. of ice water. A gum separates at this point. If the supernatant liquid is removed and the gum stirred with water, a crystalline precipitate of acetophenone 4-(3-diethylaminopropyl) semicarbazone, M. P. 65–69° C. is obtained.

A solution of 6.5 grams of acetophenone 4-(3-diethylaminopropyl) semicarbazone in 52 cc. of dilute hydrochloric acid (45 cc. of water and 7 cc. of concentrated hydrochloric acid) is refluxed for a few minutes, cooled and the separated acetophenone removed by extraction with ether. The aqueous layer is concentrated in vacuo, leaving a thick colorless oil as a residue. The latter is taken up in 10 cc. of absolute alcohol and treated with a solution of 4.0 grams of 5-nitro-2-furaldehyde in 10 cc. of absolute alcohol. A voluminous yellow precipitate is obtained, which, after recrystallization from absolute alcohol gives 4.3 grams, 37%, of 5-nitro-2-furaldehyde 4-(3-diethylaminopropyl) semicarbazone hydrochloride, M. P. 166–167° C.

ANALYSIS

|   | Calc. | Found |
|---|---|---|
| C | 44.89 | 44.75 |
| H | 6.38 | 6.38 |
| N | 20.14 | 20.46 |

EXAMPLE III

*5-nitro-2-furaldehyde 2-(2-dimethylaminoethyl) semicarbazone hydrochloride*

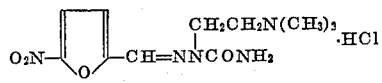

A solution of 80 grams of sodium hydroxide in 250 grams of hydrazine hydrate (100%) is heated to 85° C. To this is added, with stirring, a solution of 144 grams of dimethylaminoethyl chloride hydrochloride in 180 cc. of water, the temperature being kept at 85–95° C. by the rate of addition. The mixture is then stirred at 85–95° C. for 75 minutes, a small amount of insoluble material removed by filtration and the filtrate distilled in vacuo to remove the excess hydrazine. The residue is taken up in 1000 cc. of water and 100 cc. of concentrated hydrochloric acid added. This solution is stirred and 300 cc. of benzaldehyde is slowly added, the pH being constantly adjusted to 5–6 with dilute sodium hydroxide. The benzalazine formed is filtered off and the filtrate extracted with ether. The organic layer is distilled to remove the ether, leaving the benzaldehyde 2-dimethylaminoethylhydrazone as an oil. The latter is taken up in 300 cc. of absolute alcohol and treated with 65 grams of oxalic acid in 150 cc. of absolute alcohol. The resulting precipitate is dissolved in 300 cc. of water and the solution steam distilled to remove the benzaldehyde. The residue is evaporated to dryness in vacuo giving 65 grams of 2-dimethylaminoethylhydrazine oxalate, M. P. 145–150° C.

A solution of 58.6 grams of 2-dimethylaminoethylhydrazine oxalate in 250 cc. of water is adjusted to pH 8 with 20% potassium hydroxide solution, a solution of 20 grams of potassium cyanate in 50 cc. of water added and the solution allowed to stand at room temperature for 16 hours. The solution is acidified with concentrated hydrochloric acid and then treated with a solution of 15.0 grams of 5-nitro-2-furaldehyde in 25 cc. of alcohol. Any excess 5-nitro-2-furaldehyde is removed by ether extraction and the aqueous layer is made alkaline with saturated sodium carbonate solution. The resulting yellow solid is removed by filtration, washed with water and recrystallized from 300 cc. of alcohol. This procedure gives 17.0 grams, 31%, of 5-nitro-2-furaldehyde 2-(2-dimethylaminoethyl) semicarbazone, M. P. 162° C. If the latter is dissolved in warm alcohol and alcoholic hydrogen chloride added, the hydrochloride precipitates in quantitative yields, M. P. 226–227° C.

ANALYSIS

|   | Calc. | Found |
|---|---|---|
| Cl | 11.60 | 11.47 |

EXAMPLE IV

*5-nitro-2-furaldehyde 4-(2-diethylaminoethyl) semicarbazone hydrochloride dihydrate*

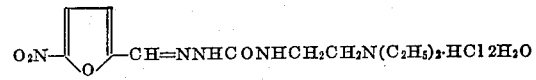

Using 30 cc. of 2-diethylaminoethylamine and 10 grams of acetophenone semicarbazone and following the procedure described in Example II, there are obtained 8.7 grams, 60%, of 5-nitro-2-furaldehyde 4-(2-diethylaminoethyl) semicarbazone hydrochloride, M. P. 185° C.

ANALYSIS

|   | Calc. | Found |
|---|---|---|
| C | 38.97 | 39.04 |
| H | 6.54 | 6.27 |
| N | 18.94 | 19.22 |

EXAMPLE V

*5-nitro-2-furaldehyde 4-(3-dimethylaminopropyl) semicarbazone hydrochloride*

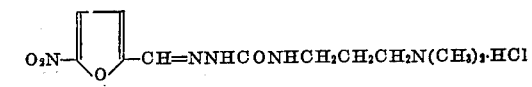

Using 40 cc. of 3-dimethylaminopropylamine and 10 grams of acetophenone semicarbazone and following the procedure described in Example II, there are obtained 8.1 grams, 45%, of 5-nitro-2-furaldehyde 4-(3-dimethylaminopropyl) semicarbazone hydrochloride, M. P. 203–204° C.

ANALYSIS

|   | Calc. | Found |
|---|---|---|
| C | 41.32 | 41.19 |
| H | 5.67 | 5.62 |
| N | 21.90 | 22.10 |

EXAMPLE VI

*5-nitro-2-furaldehyde 2-(2-diethylaminoethyl) semicarbazone hydrochloride*

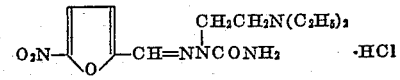

To 60 grams of hydrazine hydrate (100%) at 85° C. is added, with stirring, a solution of 41.0 grams of diethylaminoethyl chloride hydrochloride in 50 cc. of water, the temperature being kept at 85–95° C. by the rate of addition. External heat is then applied to keep the reaction mixture at 85–95° C. for 90 minutes. The solution is then cooled, made strongly acid with 50% sulfuric acid, and the precipitated hydrazine sulfate filtered off. The filtrate is adjusted to pH 7 with 20% sodium hydroxide solution and then treated with a solution of 20 grams of potassium cyanate in 50 cc. of water. The solution is then allowed to stand at room temperature for 20 hours, after which it is acidified with 20% sulfuric acid. A solution of 20 grams of 5-nitro-2-furaldehyde in 50 cc. of alcohol is added with stirring and the resulting solution extracted with ether. The aqueous layer is made alkaline with saturated sodium carbonate solution and extracted with chloroform. The organic layer is distilled to remove the chloroform and the dark residue taken up in alcohol. The alcoholic solution is then acidified with alcoholic oxalic acid, giving a dark colored solid. The latter is recrystallized from alcohol giving a bright yellow solid. The solution of this solid in 75 cc. of hot water is made alkaline with saturated sodium carbonate solution. An orange gum separates, which upon cooling crystallizes. The solid is removed by filtration, taken up in 100 cc. of absolute alcohol and acidified with alcoholic hydrogen chloride. A yellow precipitate of 5-nitro-2-furaldehyde 2-(2-dimethylaminoethyl) semicarbazone hydrochloride, which after recrystallization from alcohol, melts at 227–228° C., is obtained. Yield 5.4 grams, 7%.

ANALYSIS

|   | Calc. | Found |
|---|---|---|
| C | 43.18 | 43.43 |
| H | 6.04 | 5.81 |
| N | 20.98 | 21.42 |

EXAMPLE VII

*Methyl 5-nitro-2-furyl ketone 4-(3-diethylaminopropyl) semicarbazone hydrochloride*

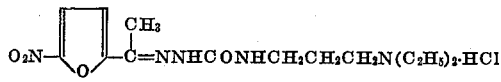

Using the procedure described in Example II, but substituting methyl 5-nitro-2-furyl ketone for 5-nitro-2-furaldehyde, there are obtained 4.8 grams, 23%, of methyl 5-nitro-2-furyl ketone 4-(3-diethylaminopropyl) semicarbazone hydrochloride, M. P. 212–213° C.

ANALYSIS

|   | Calc. | Found |
|---|---|---|
| N | 19.36 | 19.58 |

EXAMPLE VIII

*5-nitro-2-furaldehyde 4-(3-isopropylaminopropyl) semicarbazone hydrochloride*

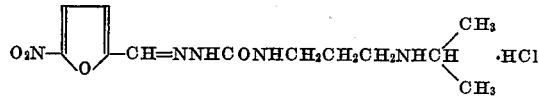

By a method similar to that described under Example II but employing in this case 3-isopropylaminopropylamine as the amine, 5-nitro-2-furaldehyde 4-(3-isopropylamino-propyl) semicarbazone hydrochloride is prepared. Yield 19.6 grams, 83%; M. P. 215–217° C. with decomposition.

ANALYSIS

|   | Calc. | Found |
|---|---|---|
| Cl | 10.65 | 10.72 |

EXAMPLE IX

*Heptyl 5-nitro-2-furyl ketone 4-(3-morpholinopropyl)-semicarbazone hydrochloride*

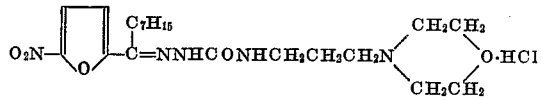

A solution of 4-(3-morpholinopropyl)semicarbazide hydrochloride is prepared as described in Example I. To this solution is added an equivalent weight of heptyl 5-nitro-2-furyl ketone dissolved in alcohol. The mixture is heated to boiling, filtered, cooled to room temperature and then made alkaline with sodium bicarbonate solution. The resulting yellow precipitate is removed by filtration, washed with water and dried. The yield of heptyl 5-nitro-2-furyl ketone 4-(3-morpholinopropyl)-semicarbazone is 82%, M. P. 103–104° C. The hydrochloride is easily prepared by dissolving the free base in absolute alcohol and acidifying with concentrated hydrochloric acid. The hydrochloride melts at 138–140° C., resolidifies and melts at 156–158° C.

EXAMPLE X

*Methyl 5-nitro-2-furyl ketone 4-(3-isopropylaminopropl)-semicarbazone hydrochloride*

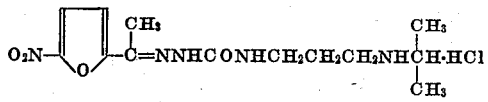

A solution of 4-(3-isopropylaminopropyl)semicarbazide hydrochloride is prepared as described in Example VIII. Using the procedure outlined in Example I, except that methyl 5-nitro-2-furyl ketone is used in place of 5-nitro-2-furaldehyde, there is obtained a 54% yield of methyl 5-nitro-2-furyl ketone 4-(3-isopropylaminopropyl)semicarbazone hydrochloride, M. P. 260° C.

EXAMPLE XI

*5-nitro-2-furaldehyde 4-(3-N-piperidylpropyl)semicarbazone hydrochloride*

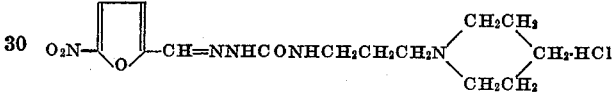

Using 16 cc. of N-(3-aminopropyl)piperidine and 4 grams of acetophenone semicarbazone and following the procedure described in Example I, a solution of 4-(3-N-piperidylpropyl)-semicarbazone is obtained. Thereafter, using the procedure described in Example IX, except that 5-nitro-2-furaldehyde is used instead of heptyl 5-nitro-2-furyl ketone, there is obtained 6 grams of 5-nitro-2-furaldehyde 4 - (3 - N - piperidylpropyl) - semicarbazone hydrochloride, M. P. 179–180° C.

EXAMPLE XII

*Propyl 5-nitro-2-furyl ketone 4-(3-N-piperidylpropyl)-semicarbazone hydrochloride*

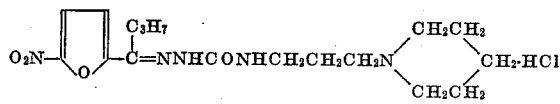

Using the reagents and procedure described in Example XI, except that propyl 5-nitro-2-furyl ketone is used in place of 5-nitro-2-furaldehyde, there is obtained 1.8 grams of propyl 5-nitro-2-furyl ketone 4-(3-N-piperidylpropyl)-semicarbazone hydrochloride, M. P. 187–188° C.

A hydrobromide corresponding to the hydrochloride produced according to the procedure described in the respective examples set forth above can be prepared by substituting for the hydrochloric acid referred to in such example an equivalent molecular amount of hydrobromic acid.

This application is a continuation-in-part of our copending application, Serial No. 240,037, filed August 2, 1951.

What is claimed is:

1. A compound having chemotherapeutic activity on parenteral administration and represented by the formulae:

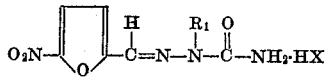

and

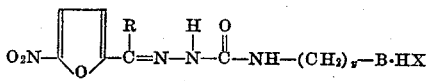

in which

R represents a member of the group consisting of hydrogen and lower alkyl,

R₁ represents a member of the group consisting of dialkylaminoalkyl, y represents 2–3, B represents a member of the group consisting of mono- and di-lower alkylamino, morpholinyl and piperidyl radicals, and X represents a member of the group consisting of Cl⁻ and Br⁻.

2. 5-nitro-2-furaldehyde 4-(3-morpholinopropyl)semicarbazone hydrochloride monohydrate represented by the formula:

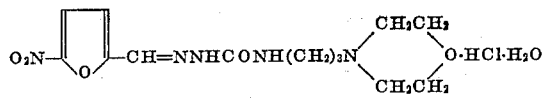

3. 5-nitro-2-furaldehyde 4-(3-diethylaminopropyl)semicarbazone hydrochloride represented by the formula:

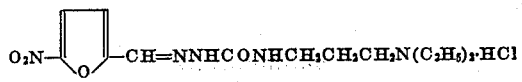

4. 5 - nitro - 2 - furaldehyde 2 - (2 - dimethylaminoethyl) semicarbazone hydrochloride represented by the formula:

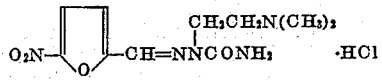

5. Methyl 5-nitro-2-furyl ketone 4-(3-diethylaminopropyl)semicarbazone hydrochloride represented by the formula:

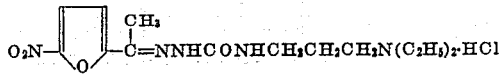

6. 5-nitro-2-furaldehyde 4-(3-isopropylaminopropyl)-semicarbazone hydrochloride represented by the formula:

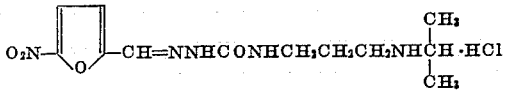

No references cited.